ABSTRACT# United States Patent

Levy

[15] 3,641,856
[45] Feb. 15, 1972

[54] CUTTING MACHINES

[72] Inventor: Marcel Louis Levy, Joffre, batiment K, Garches, France

[22] Filed: July 14, 1970

[21] Appl. No.: 54,757

[30] Foreign Application Priority Data

July 18, 1969 France..................................6923649

[52] U.S. Cl....................................83/295, 83/298, 83/320, 83/369
[51] Int. Cl.........................................................B23d 25/16
[58] Field of Search.....................83/295, 293, 320, 298, 369

[56] References Cited

UNITED STATES PATENTS 2,241,427  5/1941  Shields................................83/298 X
3,173,323  3/1965  Shields....................................83/298

*Primary Examiner*—Frank T. Yost
*Attorney*—Bacon & Thomas

[57] ABSTRACT

The cutting tool is reciprocated and the strip or sheet of material is continuously advanced by drive members in such a manner that the period of acceleration of the cutting tool to the same speed as that of the strip is constant from one cycle to another.

3 Claims, 6 Drawing Figures

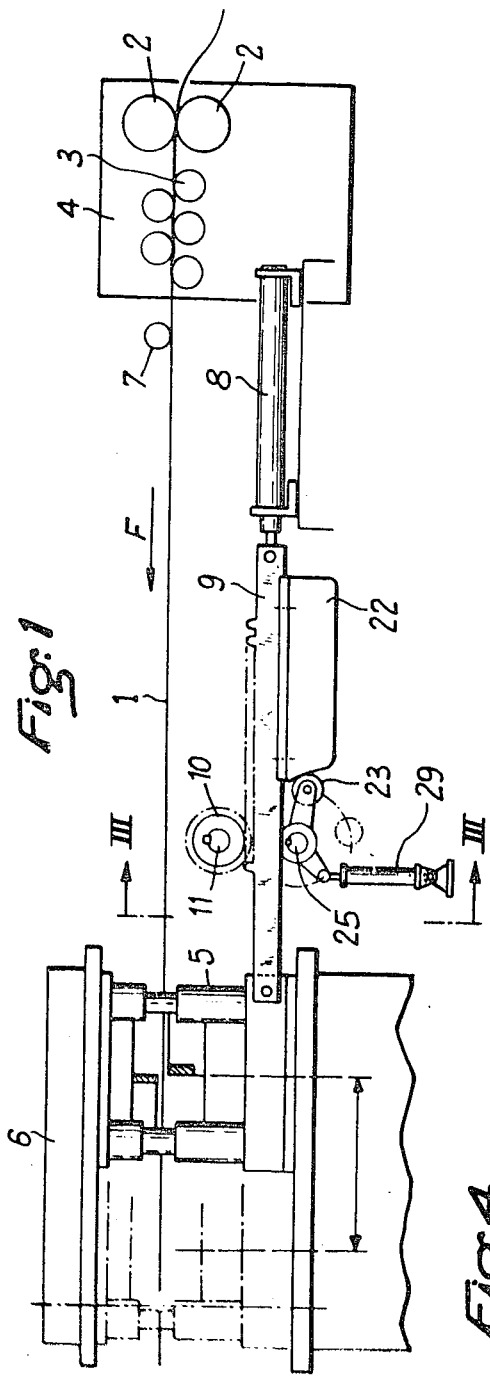
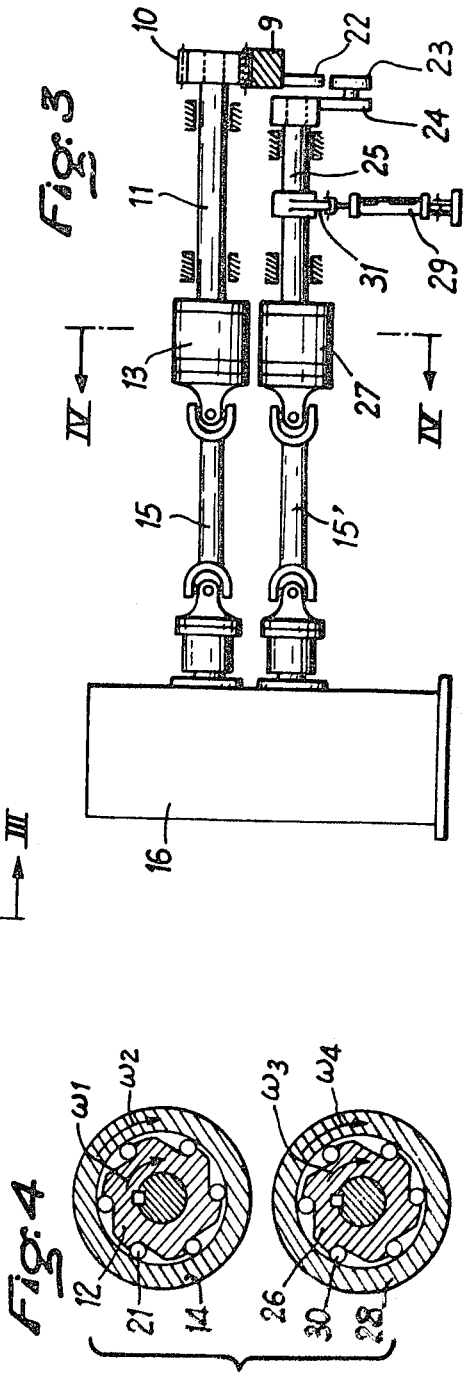
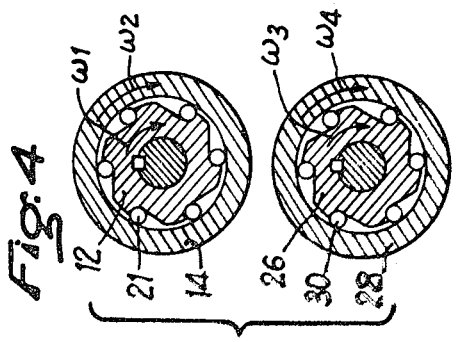
PATENTED FEB 15 1972 3,641,856
SHEET 1 OF 3
Fig.1
Fig.3
Fig.4
INVENTOR
MARCEL LOUIS LEVY
BY Bacon & Thomas
ATTORNEYS

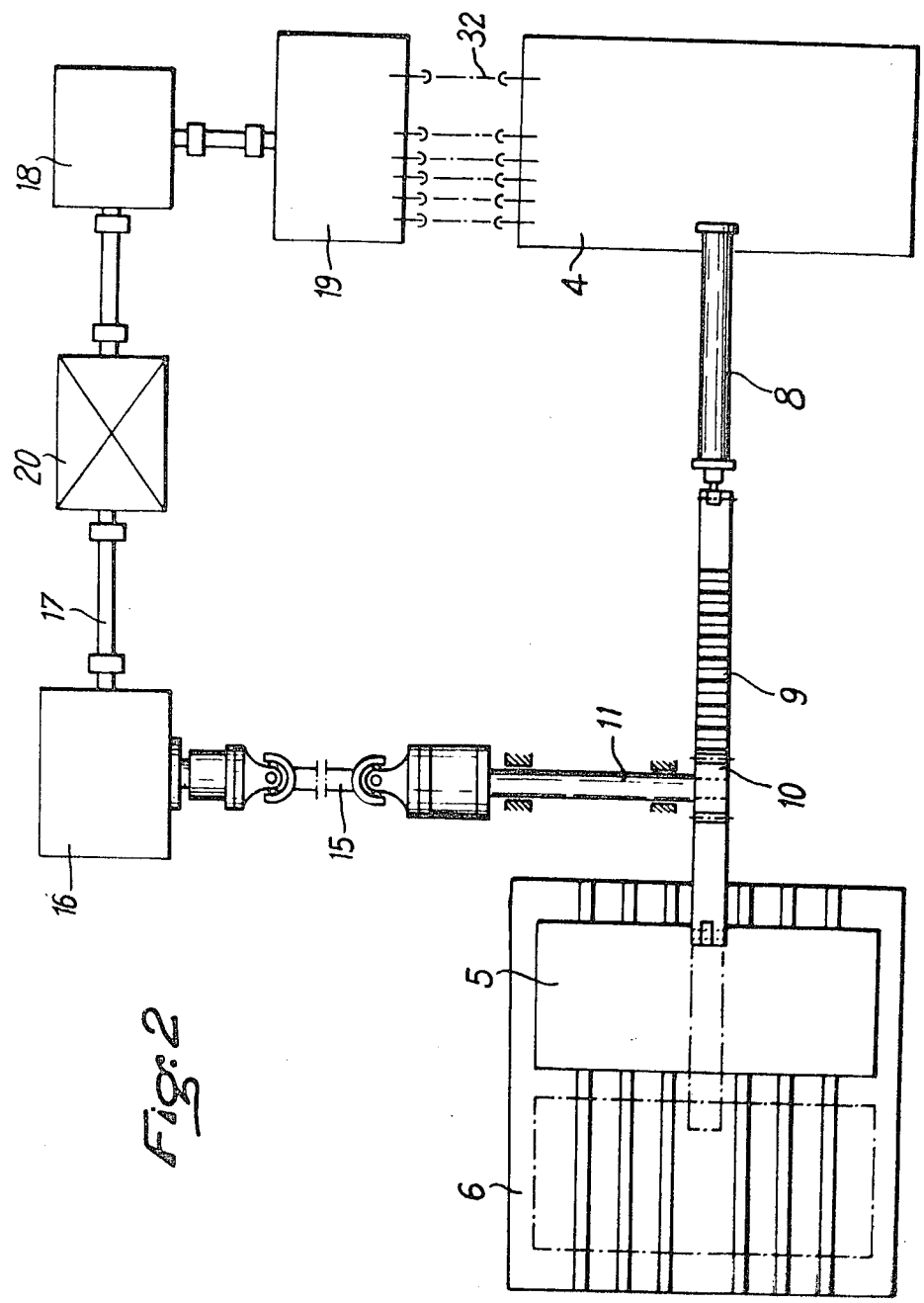

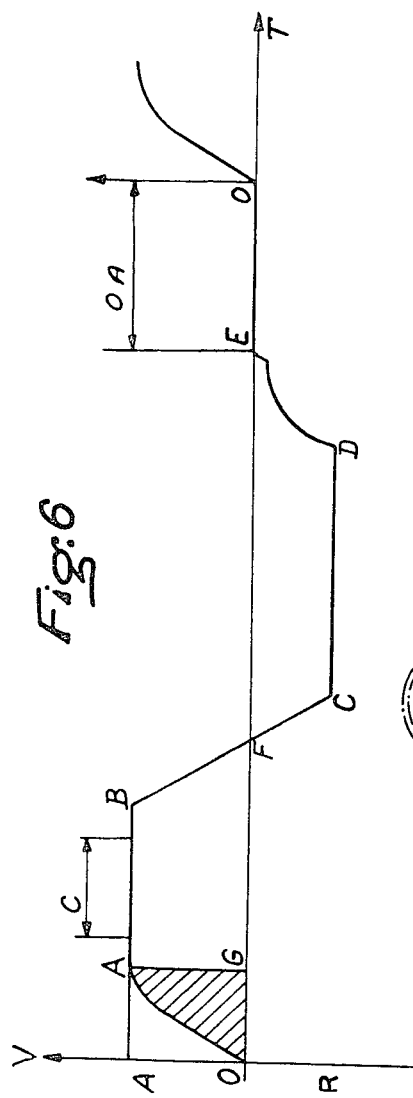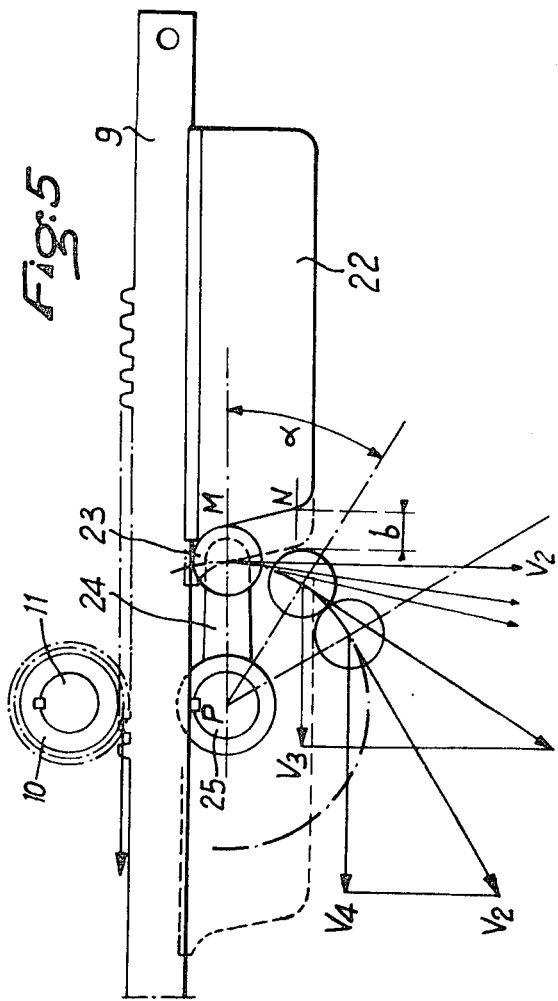

CUTTING MACHINES

Rolled strips are usually made available in the form of coils which are cut to sheet lengths. This operation is carried out over continuous shear lines, cutting at random with the aid of flying shears.

Flying shears of the cutting press type are known which are now used in forming lines; these shears usually comprise a cutting tool of the column block type displaceable between the plates of the press. The column block travels forward with the sheet iron to be cut, and then rearward after each cutting operation, the control of the translation usually being effected by means of a pneumatic or hydraulic jack.

Moreover, displaceable shears are known, generally referred to as cutters, which are usually located at the exit of a tube forming and welding line, wherein a movable carriage, bearing a circular blade having an electric drive motor, travels with the product during the cutting phase and then returns to its starting point. The type of control for the advance is the same for the tool of the cutting press.

Shears and cutters of the above-mentioned types only give mediocre cutting accuracy, since the tool is not perfectly synchronized with the product to be cut and the period of acceleration which precedes cutting is not of constant duration.

As a result, the length of product to be cut, advancing from the time of the order of start of the cycle, to the time when cutting is effected, is not constant which is evidenced by differences in length of the cut products.

The present invention has for an object a cutting machine, more particularly flying shears or cutoff saws, comprising a drive motor for driving the product to be cut, a cutting tool which is movable in the direction of advance of said product, a driving member to move said tool and means to actuate said tool. It is a more specific object so to improve such a machine that great accuracy in length of the products cut can be obtained.

According to the invention, the machine comprises unidirectional drive means, one member of which is linked without slip to the tool and the other member of which is linked without slip to a pinch roll rotating in contact with the product, in such a manner that the speed of the tool cannot exceed that of the product, and second unidirectional drive means, one member of which is connected without slip to a lever bearing a roller in contact with a cam moving at the same time as the tool and the other member of which is connected without slip to a pinch roll rotating in contact with the product, in such a manner that the law of acceleration of the tool, until this tool has reached its defined speed equal to that of the product, is constant.

With such an arrangement according to the invention, the tool passes, at the time of the order of start of the cycle, from zero speed to a speed equal to that of the product to be cut, according to a fixed law, and thereafter maintains this speed. It results therefrom that the length of cut is equal, with very great accuracy, to the length which is marked between two orders to start of the cycle.

The improved cutting machine according to the present invention allows the cutting for example of strip moving at a speed which may reach 100 m./min.

In order that the invention may be more clearly understood, reference will now be made to the accompanying drawings which show one embodiment of machine, purely by way of example, and in which:

FIG. 1 shows a complete view in elevation of the machine preceded by a flattening machine having pinch rolls for engaging the strip, FIG. 2 shows a plan view of the whole of the device of FIG. 1, FIG. 3 shows a section along the line III—III of FIG. 1, FIG. 4 shows a section along the line IV—IV of FIG. 3, FIG. 5 shows a diagram of the acceleration device, and FIG. 6 shows a diagram of the cycle of speeds of the cutting tool as a function of time.

Referring now to the accompanying drawings, in FIG. 1, the metal strip 1 is passed continuously in the direction of the arrow F at a speed imposed by pinch feed rolls 2 followed preferably by flattening rollers 3 mounted in a frame 4. The strip is drawn between the blades of a tool 5 displaceable between the plates of a press 6, of type known per se, which provides the cutting action on descent of the upper plate whilst the tool is advancing at the speed of the strip. The cutting order is given by apparatus for measuring the length of the sheet, known per se, for example a pulse generator driven by a measuring roller 7. This apparatus measures continuously the length of sheet being unwound from the coil and gives a pulse to start the cutting cycle each time that the length measured is equal to the length displayed.

The pulse to start the cutting cycle induces the action of a jack 8 connected to the tool 5 by means of a rack 9, in such a manner that this tool 5 is pushed in the direction of advance of the strip. The movements which follow, such as the descent of the plate of the press 6, its ascent and return of the tool to its starting position by means of the jack 8, occur in automatic order using known means.

The operating cycle of the tool 5 is shown in FIG. 6 and comprises the following phases:

Acceleration along OA

Constant speed of advance along AB. The cut is effected between points A and B.

Braking and changing direction along BC;

Return of the tool at constant speed along CD:

Hydraulic braking and immobilization in thrust by a stop at the starting point along DE.

As is apparent more particularly from FIGS. 3 and 4, the rack 9 is engaged with a pinion 10 keyed on a shaft 11; the inner race 12 of a free wheel 13 is also keyed on this latter, the outer race 14 of which is connected mechanically to the pinch rolls 2, as shown on FIG. 2, for example by means of a cardan joint 15, a reduction gear 16, a shaft 17, reducers 18 and 19 and an articulated drive shaft. An electric motor 20, preferably with DC current, is mounted on the shaft 17 and controls therefore both the displacement of the strip 1 at the chosen unwinding speed, by supplying the necessary power for flattening this strip and the rotational movement of the race 14. This motor may operate as a generator brake under the thrust of the jack 8 in advance phase of the tool, as will be seen hereinafter.

It will be apparent from the foregoing that the angular speed of the race 14 is constantly proportional to that of the strip 1. The reductions given by the reduction gears 16, 18 and 19 are determined in such a manner that, taking into account the radius of the pinion 10, the races 12 and 14 have the same angular speed when the strip 1 and the tool 5 have the same linear speed.

The functioning of the shears is as follows:

When the order to cut is given, the jack 8 pushes in the direction of motion of the strip, the unit of the rack 9 and the tool 5 and subjects them to acceleration corresponding an angular acceleration of the race 12 until the speed $w_1$ of this race is equal to the constant speed $w_2$ of the race 14 which brings about a locking of the rollers 21 of the free wheel 13. From this time, the two races 12 and 14 rotate at the same speed and the speed of displacement of the tool 5 is kept mechanically equal to the speed of the strip 1.

Cutting is effected during the synchronized advance phase. After cutting, the jack 8 brings the tool 5 back, the race 12 rotating in the direction opposite to $w_1$ whilst the race 14 continues to rotate in the same direction, the free wheel 13 being disengaged running light.

However, it is not sufficient to obtain a constant cutting length that, after the period of acceleration, the tool moves at the same speed as the strip. It is necessary, moreover, for the tool travel during the period of acceleration OA and which is shown by the hatched area on FIG. 6, has to remain constant. This is achieved, according to the invention due to a constant law of acceleration.

The control device for the law of acceleration is shown on FIG. 5 and comprises a cam 22 displaceable with the cutting tool 5 and fixed, for example on the rack 9; this cam comprises a diagonal ramp which links up with a part, preferably rectilinear, and parallel to the rack 9. The advance of the cam 22 under the thrust of the jack 8 drives a roller 23 fixed in a lever 24 secured to a pivoting shaft 25; the inner race 26 of a free wheel 27 is keyed on the latter, the outer race 28 of which is linked by a coupling 15' to the reduction gear 16; the race 28 therefore rotates permanently at a speed linked to that of the strip 1. A pneumatic jack 29, whose piston rod is articulated to a lever 31 keyed to the shaft 25, permanently maintains the roller 23 in contact with the cam 22.

Referring to FIG. 5, there are herein shown:

$V_1$ the speed of unwinding of the strip 1, which is equal to the circumferential speed of the pinion 10;

$V_2$ the maximum circumferential speed of the shaft of the roller 23 about the shaft 25 when the free wheel 27 is locked by its rollers 30, i.e., when the angular speed $w_3$ of the race 26 is equal to the angular speed $w_4$ of the race 28: $V_2 = w_4 \times R$, R being the length of the lever 24, $V_3$ the projection of the vector $V_2$ over a horizontal axis corresponding to an angle $\alpha$ of the lever 24 such that $V_3 = V_1$. Hence: $V_3 = V_2 \sin \alpha$;

$V_4$ the projection of the vector $V_2$ when the roller 23 is rolling on the substantially rectilinear part of the cam 22, the lever 24 having exceeded the angle of rotation $\alpha$.

The operation of the control device for the law of acceleration according to the invention is as follows:

When the cutting order is given, the tool is in a rest position and hence $\alpha=0$, thus $\sin \alpha=0$. As soon as the cam 22 begins its displacement at even slight speed V, the condition $V=V_2 \sin \alpha$ is necessarily produced. Consequently, the angular speed $w_3$ of the lever 24 is immediately equal to its maximum value $w_4$, the race 26 being locked on the race 28 by the rollers 30 under the thrust of the jack 8 transmitted by the cam 22 to the roller 23.

The cam 22 remains under pressure on the roller until one rotation of the lever 24 by an angle $\alpha$ such that the horizontal projection $V_3$ of the speed $V_2$ is equal to the speed of the strip $V_1$, which is written: $V_3 = V_2 \sin \alpha = V_1$.

Beyond the angle $\alpha$, it is the pinion 10 and the free wheel 13 which define the speed of the tool to a constant value as hereinbefore described.

When the free wheel 13 is in a locking position, the free wheel 27 is disengaged, the race 28 rotating faster than the race 26.

The diagram of FIG. 6 represents the speed of the tool V as a function of the time T, R corresponds to the return of the tool, A to the advance thereof. The tool in cutting position and the tool in stop position are shown respectively by C and OA.

On the graph of FIG. 6, it can be seen that the acceleration sinusoid OA is cut at A by a horizontal straight line AB corresponding to the constant speed phase.

It will be noted that there is no shock on the free wheels at the point A for it passes from one free wheel to the other without drastically altering the speed of the tool.

In conclusion:

A first free wheel defines the speed of advance of the tool 5 by imparting thereto progressive acceleration on a constant displacement $b$, under the thrust of the jack 8.

A second free wheel limits the speed of advance of the tool under the thrust of the jack 8, to a constant value equal to the speed of the strip 1 and frees the first free wheel.

The return of the tool is effected by the jack 8, the two free wheels being disengaged.

The tool returns to stop at the starting position, ready for another cutting operation.

Due to the device according to the invention, the length of strip which travels with respect to the tool between the starting order of the cutting cycle and the effective cut is always constant.

It may be added that the accuracy of the shears depends moreover on the response time of the jack, i.e., the time which passes between the starting pulse for the cutting cycle supplied by the computer and the start of the movement of the rod of the jack. This time must be constant and as short as possible.

In order to reduce this time, an accumulator will be located preferably on the hydraulic control circuit of the jack.

In a modification within the scope of the invention, the law of acceleration may be other than sinusoidal, if the portion MN of the cam is not rectilinear.

In another modification, the advance and return driving thrust for the tool can be supplied by a member other than the jack 8, such as for example, an electric motor or an hydraulic motor, controlling the rack 9.

Other means can be conceived for applying the driving action within the scope of the invention.

Moreover, within the scope of the invention, the members may be differently arranged; for example, the free wheels may be mounted on the reduction gear 16 or in the hub of the pinion 10, and the cam 22 may be fixed on the cutting carriage instead of being fixed on the rack.

The free wheels may also be replaced by any other unidirectional drive mechanism, i.e., a mechanism allowing relative angular movement of two shafts in one direction and not in the opposite direction.

I claim:

1. In a machine for effecting an operation on a moving product of the kind comprising a drive motor for said product, a tool for effecting the said operation and being movable in the direction of movement of said product, drive means to displace said tool and means for actuating the said tool, the improvement which consists in that said drive means includes two unidirectional members, one member of which is linked without slip to the tool and the other member of which is linked without slip to a pinch roll rotating in contact with said product, whereby the speed of said tool cannot exceed that of said product, and wherein is provided a second unidirectional drive means also having two members, one member of which is linked without slip to a lever bearing a roller in contact with a cam moving at the same time as said tool and the other member of which is linked without slip to a pinch roll rotating in contact with the product, whereby the mathematical law of acceleration of the tool as a function of the time, as well as the travel as a function of the time until this tool has reached its defined speed, equal to that of the product, are constant from one cycle to the other independently of the speed.

2. A machine according to claim 1, wherein said unidirectional drive means are both constituted by overrunning clutches.

3. A machine according to claim 1, wherein said driving member for displacing said tool is constituted by a hydraulic jack.

* * * * *